No. 692,326.  
Patented Feb. 4, 1902.

M. M. MILLIS.
ANTICRIBBING DEVICE.
(Application filed Nov. 23, 1901.)

(No Model.)

Witnesses

Inventor
M. M. Millis
By
Attorneys

THE NORRIS PETERS CO., PHOTO-LITHO., WASHINGTON, D. C.

UNITED STATES PATENT OFFICE.

MELVIN M. MILLIS, OF COOPERSTOWN, NEW YORK.

ANTICRIBBING DEVICE.

SPECIFICATION forming part of Letters Patent No. 692,326, dated February 4, 1902.

Application filed November 23, 1901. Serial No. 83,436. (No model.)

*To all whom it may concern:*

Be it known that I, MELVIN M. MILLIS, a citizen of the United States, residing at Cooperstown, in the county of Otsego and State of New York, have invented certain new and useful Improvements in Anticribbing Devices; and I do hereby declare the following to be a full, clear, and exact description of the invention, such as will enable others skilled in the art to which it appertains to make and use the same.

This invention provides a means for breaking horses of the pernicious habit of cribbing without interfering with their feeding, and it is also designed to prevent biting animals from inflicting injury on any person.

The invention is in the nature of an attachment for use in connection with a halter or bridle, although any form of head-strap may be utilized for attachment of the device to the animal addicted to cribbing or biting to cure it of either one or both of these evils.

For a full description of the invention and the merits thereof, and also to acquire a knowledge of the details of construction of the means for effecting the result, reference is to be had to the following description and drawings hereto attached.

While the essential and characteristic features of the invention are susceptible of modification, still the preferred embodiment of the invention is illustrated in the accompanying drawings, in which—

Figure 1:
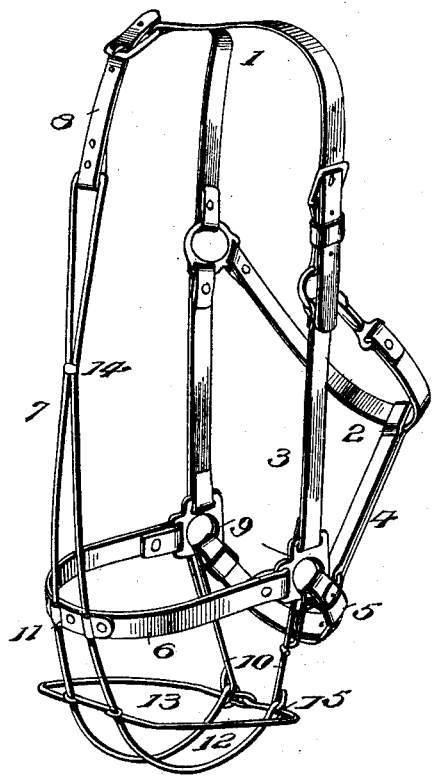
Figure 2:
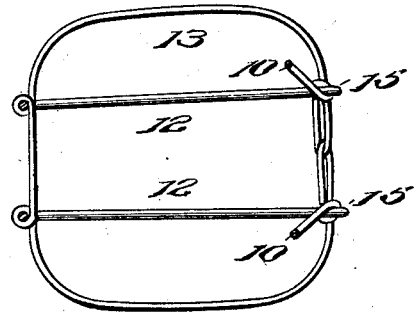

Figure 1 is a perspective view of a halter having the anticribbing device applied thereto. Fig. 2 is a plan section above the nose-band of the device.

Corresponding and like parts are referred to in the following description and indicated in both views of the drawings by the same reference characters.

The halter illustrated is of the five-ring type and comprises the head-strap 1, throat-strap 2, cheek-straps 3, throat latch or tongue 4, chin-strap 5, and nose-strap 6, the several straps being connected by links in the manner substantially as shown. The anticribbing device consists, essentially, of a frame 7, suspended from the head-strap 1 by means of a tongue or strap 8 and connected at its lower end with the side links 9 of the halter by means of wires or hangers 10. The frame 7 is clipped to the nose-strap 6, as shown at 11, and its lower portion curved, as shown at 12, to extend around the nose and prevent the animal from getting any part of the stall between the teeth. The upper portion of the frame 7 is adapted to extend in front of the head, and the curved nose portion is connected by means of a nose-band 13, which is secured to the front and rear parts of the curved portion, so as to prevent displacement and hold the elements in proper position.

The frame 7 comprises complementary side members and is formed of a single length of wire folded upon itself and having the folded end engaged by a loop at the end of the strap 8 and having the side portions brought together and secured, as shown at 14, and gradually spread from said point to the ends, which are bent to form eyes 15, into which the lower ends of the hangers 10 are looped. The nose-band 13 is likewise formed of a single length of wire and is twisted about the members of the frame 7 and has its ends interlocked or looped and its rear portion supported by means of the eyes 15, through which it passes.

When the anticribbing device is in position, the band 13 encircles the nose, and the lower curved portion of the frame 7 extends around the nose and across the mouth in such a manner as to prevent the animal from gripping any part of the stall, like fixture, or object between its teeth.

Having thus described the invention, what is claimed as new is—

1. In combination with a halter, an anticribbing device comprising a frame suspended from the head-strap and adapted to extend in front of the head and around the nose, a nose-band connecting oppositely-curved portions of the frame, and hangers connecting the lower rear portion of the said frame with the side links of the halter, substantially as specified.

2. In combination with a halter having side links, a frame suspended from the head-strap of the halter and comprising side members having their lower ends curved to extend around the nose and terminating in eyes, hangers connecting the rear ends of the frame members with the said side links, and a noseband having its rear portion passing through the aforesaid eyes of the frame members and having its front portion bent to encircle the said frame members, substantially as set forth.

In testimony whereof I affix my signature in presence of two witnesses.

MELVIN M. MILLIS. [L. S.]

Witnesses:
CLARENCE G. COOK,
JOHN M. HOUCK.